April 21, 1964     E. C. HALLANGER     3,129,587
FLOW SENSING DEVICE

Filed Oct. 11, 1960     2 Sheets-Sheet 1

INVENTOR.
ERLING C. HALLANGER
BY
ATTORNEY

April 21, 1964  E. C. HALLANGER  3,129,587
FLOW SENSING DEVICE
Filed Oct. 11, 1960  2 Sheets-Sheet 2

INVENTOR.
ERLING C. HALLANGER
BY
ATTORNEY

United States Patent Office 3,129,587
Patented Apr. 21, 1964

3,129,587
FLOW SENSING DEVICE
Erling C. Hallanger, St. Paul, Minn., assignor to Minneapolis-Honeywell Regulator Company, Minneapolis, Minn., a corporation of Delaware
Filed Oct. 11, 1960, Ser. No. 61,893
2 Claims. (Cl. 73—211)

The present invention is concerned with an improved flow measuring or sensing apparatus; in particular, the apparatus senses the average total pressure on the upstream and downstream side of a restriction so the difference in average total pressure provides a signal indicative of air velocity and flow through the restriction.

In air conditioning systems, the need for improved apparatus for measuring or sensing the quantity of air passing through air conditioning ducts has always been recognized. There are many apparatuses presently available for obtaining a signal indicative of the velocity of air passing through a duct; however, these apparatuses are either quite elaborate requiring a considerable amount of expensive equipment or they have some shortcomings which make them particularly unsatisfactory for air conditioning In an apparatus for measuring the flow of air through a duct, the main object is to keep the cost at a minimum. The cost of such an apparatus not only is in the expense of the apparatus itself, but often a conventional flow or velocity measuring or sensing apparatus requires special duct work for adapting the apparatus to an air conditioning installation which becomes expensive.

Another shortcoming of conventional velocity measuring apparatus is in the requirement of minimum turbulence for successful use of the apparatus. Generally, to use conventional apparatus, a relatively long span of duct must be available so the air flow has a straight run through the duct before it comes to the velocity sensing apparatus. Obviously, such a limitation hampers the use of many velocity measuring apparatuses.

In the present invention, a relatively simple means is provided for measuring or sensing the velocity and flow in an air duct. A perforated plate or sheet restriction is placed in the duct and the average total pressure is measured on the upstream and downstream of the restriction. The difference in the average total pressure provides a signal indicative of the velocity, and if the velocity is known, total flow through the duct can be readily computed.

Therefore, an object of the present invention is to provide an improved velocity and/or flow measuring or indicating apparatus.

Another object of the present invention is to provide a velocity responsive apparatus having a restriction and a means for measuring the average total pressure on the upstream and downstream side of the restriction.

Another object of the present invention is to provide a velocity responsive apparatus which is adapted to be installed in a duct with a minimum amount of work.

These and other objects of the present invention will become apparent upon the study of the specification and drawings of which:

Figure 1:
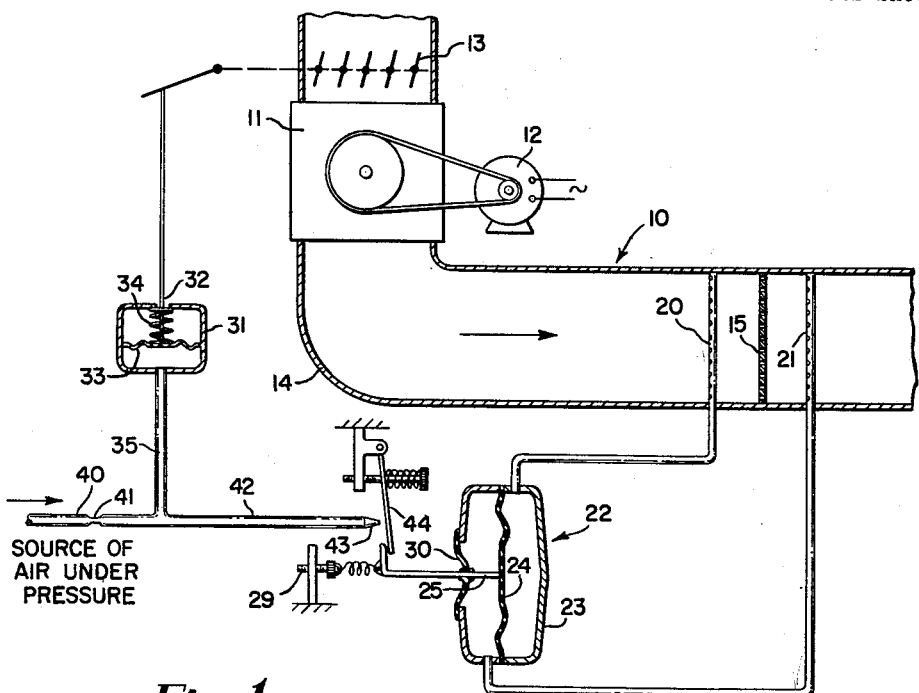
FIGURE 1 is a schematic showing of an air conditioning duct wherein a variable air velocity is available with means for regulating or controlling the velocity.
Figure 2:
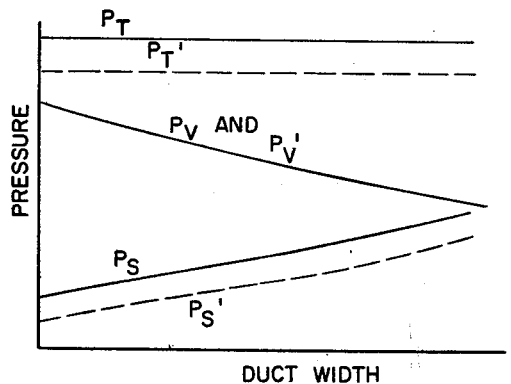
FIGURE 2 is a graphical representation of the various pressure measurements across the width of the duct.
Figure 4:
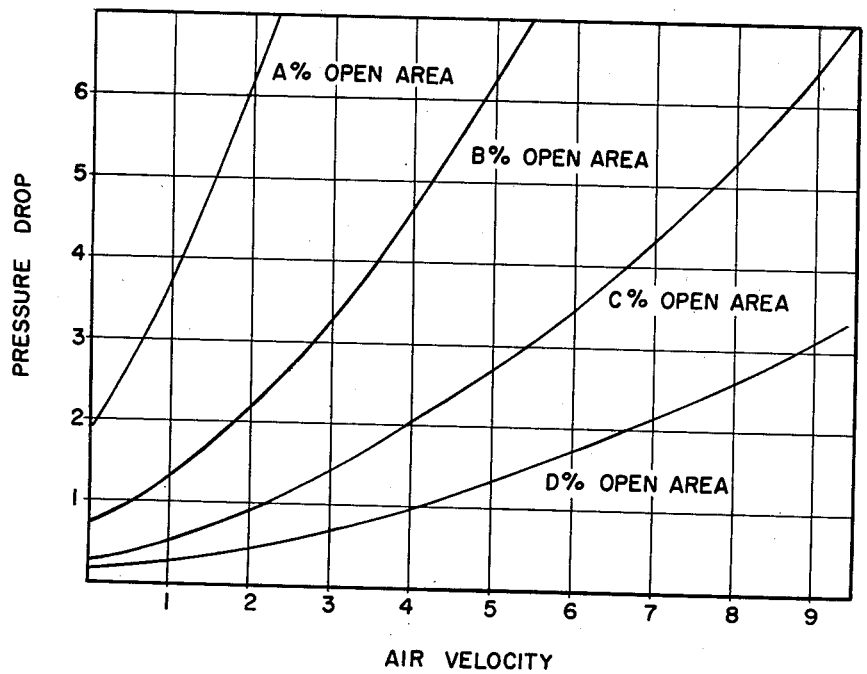
FIGURE 4 is a graphical showing of the characteristics of various aspects of the invention. Curves of the pressure drop vs. velocity are shown for different plates having various percentages of open area.

Referring to FIGURE 1, an air duct 10 is shown connected upstream of fan 11 which is driven by a motor 12. The fan moves air through duct 10 at a velocity selected by the position of dampers 13. The duct and fan apparatus is shown for explanation purposes, and the apparatus could be a part of any type of air conditioning system where the velocity or flow of the air through a duct is to be controlled. Located upstream of a 90° elbow 14 in the duct is a perforated plate or sheet 15 which is placed across the duct at right angles thereto. The sheet forms a restriction to air flow through the duct. The plate might be a metal plate with a plurality of regularly spaced, $5/16$ inch, holes for allowing the air to pass through. The number and size of the holes are selected to result in a certain percent of open area. From the graphical representation of FIGURE 4, a perforated plate is selected which has the correct percentage of open area to produce, at the desired or controlled velocity (or flow), a pressure drop within the operating range of the measuring or controlling device is used. For example, if the measuring or controlling device is to respond to a pressure between 2 and 3 and the air velocity is between 4 and 5, a sheet of C percent is used. Located on the upstream and downstream side of plate 15 are average, total pressure sensing pipes 20 and 21. Each of the pipes is sealed at one end and has a plurality of holes which have their bore axis parallel so the pipe can be placed across the duct and all the holes can face into the air stream. The open end of the pipe is adapted to be connected to a pressure responsive apparatus 22. Pipes 20 and 21 might be made of $3/8$ inch OD copper tubing with a number of $1/16$ inch holes drilled along the front surface of the pipe.

Pressure responsive apparatus 22 comprises a chamber or housing 23 which has a diaphragm 24. Pipes 20 and 21 are connected to the chamber on each side of diaphragm 24 so the diaphragm responds to the pressure difference available from pipes 20 and 21. An output shaft 25 is connected to diaphragm 24. The output shaft passes through housing 23 at a seal-off connection which comprises a flexible member 30. Apparatus 22 is calibrated by a screw 29.

A pressure operated motor 31 has an output shaft 32 connected to a lever for positioning dampers 13. The motor comprises a diaphragm 33 which is moved upward against a spring 34 when pressure develops in the chamber under the diaphragm. A pipe 35 is connected to the chamber of the motor 31. Air pressure is available through a pipe 40 from a source of air under pressure. Pipe 40 is connected through a restriction 41 to pipe 35 and a pipe 42. Connected to the end of pipe 42 is a nozzle 43 which has a movable flapper 44 positioned by the output shaft 25 of the pressure responsive device 22. Flapper 44 is spring biased against nozzle 43 so that when the pressure on the right side of diaphragm 24 is greater than on the left, nozzle 43 is closed. When nozzle 43 is closed, a pressure is built up in motor 31 to close dampers 33 to cut down the flow of air from fan 11.

The velocity, hence velocity pressure (Pv), and the static pressure (Ps) are found to vary across the width of the duct. The total pressure (Pt) is found to vary only slightly across the duct width. These pressures are defined in the Heating and Ventilation Guide published by the ASHVE as follows:

Pressure, Static: The normal force per unit area that would be exerted by a moving fluid on a small body immersed in it if the body were carried along with the fluid. Practically, it is the normal force per unit area at a small hole in a wall of the duct through which the fluid flows (piezometer) or on the surface of a stationary tube at a point where the disturbances, created by inserting the tube, cancel. It is supposed that the thermodynamic properties of a moving fluid depend on static pressure in exactly the same manner as those of the same fluid at rest depend upon its uniform hydrostatic pressure.

Pressure, Total: In the theory of the flow of fluids; the sum of the static pressure and the velocity pressure at the point of measurement.

Pressure, Velocity: In a moving fluid, the pressure capable of causing an equivalent velocity, if applied to move the same fluid through an orifice such that all pressure energy expended is converted into kinetic energy.

The variation in the velocity pressure and the static pressure across the duct is due to various turbulent conditions which take place in the duct. Such turbulent conditions are more common when a restriction or elbow is in the duct a short distance upstream of the place where the pressure is being measured. These turbulences can result in a false measurement of the air velocity in the duct by conventional velocity measuring apparatus. For example, a Pitot tube is often used to measure the velocity of the air in a duct. If the locality where the Pitot tube is placed has a cross air velocity due to some turbulent condition set up in the duct, the Pitot tube velocity measurement may be incorrect.

When the average total pressure is used as a means of measuring the velocity, any turbulence in the duct has been found to have little effect. Since the total pressure is the sum of the velocity and static pressure, a condition which might arise due to turbulence may change the static pressure and the velocity pressure, but the sum of the two pressures at that particular point is relatively constant, since where velocity pressure is high, static pressure is low.

The average total pressure is taken, rather than total pressure at a single point, to allow for situations where turbulence would make it impossible for a single total pressure pickup to always face upstream. If a single pressure probe was used, the air flow at that particular location may be at an angle to the duct length due to some duct characteristics; therefore, a false total pressure measurement would be obtained if the probe faced directly up the duct length. The loss of energy which is brought about by the resistance to the air flow by the perforated sheet 15 has been found to be a function of the difference in average total pressure across the sheet. By means of pipes 20 and 21 located slightly upstream and downstream, respectively, the average total pressure upstream and downstream is measured. The difference in average total pressure is indicative of the velocity of the air passing through the duct.

If a preselected velocity is to be maintained in duct 10, pressure responsive apparatus 22 is calibrated to maintain a position of dampers 13 so the air flow is held constant to duct 10. Whenever the air flow increases and the difference between the pressure measured by pipes 20 and 21 changes, dampers 13 are repositioned by motor 31 to change the air velocity.

Figure 3:
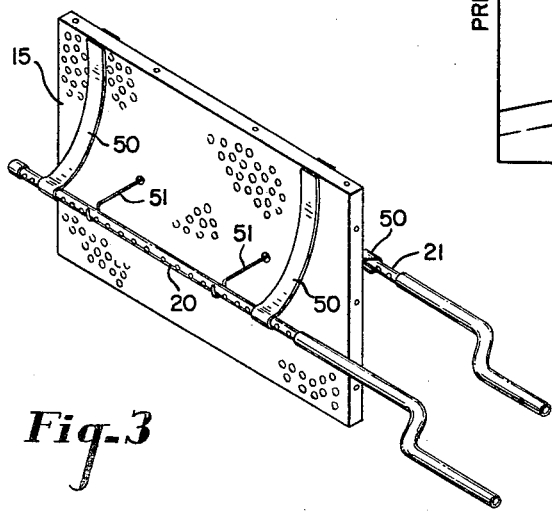
FIGURE 3 is a perspective view of one embodiment of the present invention showing the perforated sheet with the movable pressure responsive devices.

Referring to FIGURE 3, the perforated plate 15 is shown with pipes 20 and 21 attached to the plate by means of flexible straps 50 and spacers 51. Such a design provides for the insertion of the unit as a whole through an opening in the side of the duct. After the unit is inserted into the duct, pipes 20 and 21 can be pivotally moved to the front and rear, respectively of plate 15 so the holes in pipes 20 and 21 are directed into the air stream or to the left as shown in duct 10 of FIGURE 1. Once the pipes are in position, spacers 51 are inserted. Such a design as shown in FIGURE 3 would provide for the manufacture of a complete unit which could be easily installed in the field and connected through an appropriate pressure differential responsive apparatus such as 22 to make use of the signal indicative of the air velocity in the duct.

While the invention has been described in one particular manner as applied to an air velocity control apparatus in an air conditioning system, the air velocity sensing apparatus might have other applications; therefore, the intention is to limit the invention only by the scope of the appended claims in which I claim:

1. An apparatus adapted to measure the velocity of air moving in a duct, an air flow restriction means adapted to be placed into a duct whereby said restriction means partially restricts the flow of air through the duct to provide a measurable pressure drop, a first and a second pressure sensing means, means pivotally connecting and supporting one of said sensing means on said air flow restriction means whereby said sensing means can be moved to an active position adjacent said air flow restriction means after said restriction means is mounted in a duct, means connecting the other of said sensing means on said air flow restriction means, said first and second sensing means when mounted on said restriction means forming an assembly with said first sensing means upstream said restriction means and said second sensing means downstream said restriction means, means adapted to hold said assembly in the duct, pressure differential responsive means providing a signal indicative of the difference in pressure between two pressure sources, and means for connecting said differential responsive means to said first and second sensing means whereby the difference between the upstream and downstream air pressures provides a signal indicative of the velocity of the air flow in said duct and through said restriction means.

2. In apparatus adapted to measure the velocity of moving air in a duct, a perforated sheet adapted to be placed into a duct through an opening whereby said sheet restricts the flow of air through the duct to develop an air pressure difference between the upstream and downstream sides of said sheet, a first pipe having a plurality of holes spaced along the length of said pipe, means pivotally connecting and supporting said pipe on said plate so said pipe can be moved from a position adjacent said sheet to a position upstream said sheet after said sheet is placed in the duct, a second pipe having a plurality of holes spaced along the length of said pipe, means pivotally connecting and supporting said second pipe on said plate so said second pipe can be moved from a position adjacent said sheet to a position downstream said sheet after said sheet is placed in the duct, said holes in said first and second pipes being adapted to face upstream said duct into the air stream when moved from the position adjacent said sheet, means for sealing said duct after said sheet and said pipes are in said duct, and means adapted to be connected to said pipes to respond to the upstream and downstream average total pressure of the duct whereby a difference between said upstream and downstream pressure is indicative of the velocity of air flow in the duct.

References Cited in the file of this patent

UNITED STATES PATENTS

| | | |
|---|---|---|
| 2,714,819 | Clark | Aug. 9, 1955 |
| 2,927,462 | Li | Mar. 8, 1960 |
| 3,071,001 | Goldsmith | Jan. 1, 1963 |

FOREIGN PATENTS

| | | |
|---|---|---|
| 405,986 | Germany | Nov. 15, 1924 |